US005105426A

United States Patent [19]

Hagiwara

[11] Patent Number: 5,105,426

[45] Date of Patent: Apr. 14, 1992

[54] DEVICE FOR DETECTING THE POSITION OF BROKEN LINE IN A SERIES CONTROLLER

[75] Inventor: Masao Hagiwara, Kanagawa, Japan

[73] Assignee: Kabushiki Kaisha Komatsu Seisakusho, Tokyo, Japan

[21] Appl. No.: 457,792

[22] PCT Filed: May 1, 1989

[86] PCT No.: PCT/JP89/00460

§ 371 Date: Dec. 29, 1989

§ 102(e) Date: Dec. 29, 1989

[87] PCT Pub. No.: WO89/11191

PCT Pub. Date: Nov. 16, 1989

[30] Foreign Application Priority Data

May 6, 1988 [JP] Japan ..................... 63-110120

[51] Int. Cl.[5] .................. G06F 11/00

[52] U.S. Cl. .................. 371/20.1; 371/20.6

[58] Field of Search .................. 371/20.1, 20.6; 324/532, 535; 364/184

[56] References Cited

U.S. PATENT DOCUMENTS 4,122,358 10/1978 Altmann .................. 371/20.1

4,907,227 3/1990 Unno .................. 371/20.6

OTHER PUBLICATIONS

Albaugh et al., Fault Detection Serial Communication Bus, IBM Technical Disclosure Bulletin, vol. 22, No. 5, Oct. 1979, pp. 1778–1779.

*Primary Examiner*—Charles E. Atkinson

*Attorney, Agent, or Firm*—Diller, Ramik & Wight

[57] ABSTRACT

When a press or like machine is centrally controlled, many sensors are used for detecting the conditions of various portions of the machine and many actuators are used for controlling the conditions of various portions of the machine. The invention provides a device for detecting the position of broken line in a series controller wherein peripheral processing devices indirectly control the sensors and the actuators, and these peripheral processing devices are connected in series via signal lines in an annular manner via a central processing unit or in a serial manner relative to the central processing unit, such that position of breakage on the signal line can be detected. Therefore, when breakage develops on the signal line and no signal is transmitted to the peripheral processing device directly after the broken line, the peripheral processing device produces a line breakage signal. Upon receiving the line breakage signal from a controller of a preceding stage, the peripheral processing devices in the subsequent stages add the broken line position data of broken line signal one by one successively. Thus, as the line breakage signal is input to the central processing unit, the calculation is carried out in a reversed manner from the added value of broken line position data of line breakage signal that is input, and a position of broken line is detected.

6 Claims, 9 Drawing Sheets

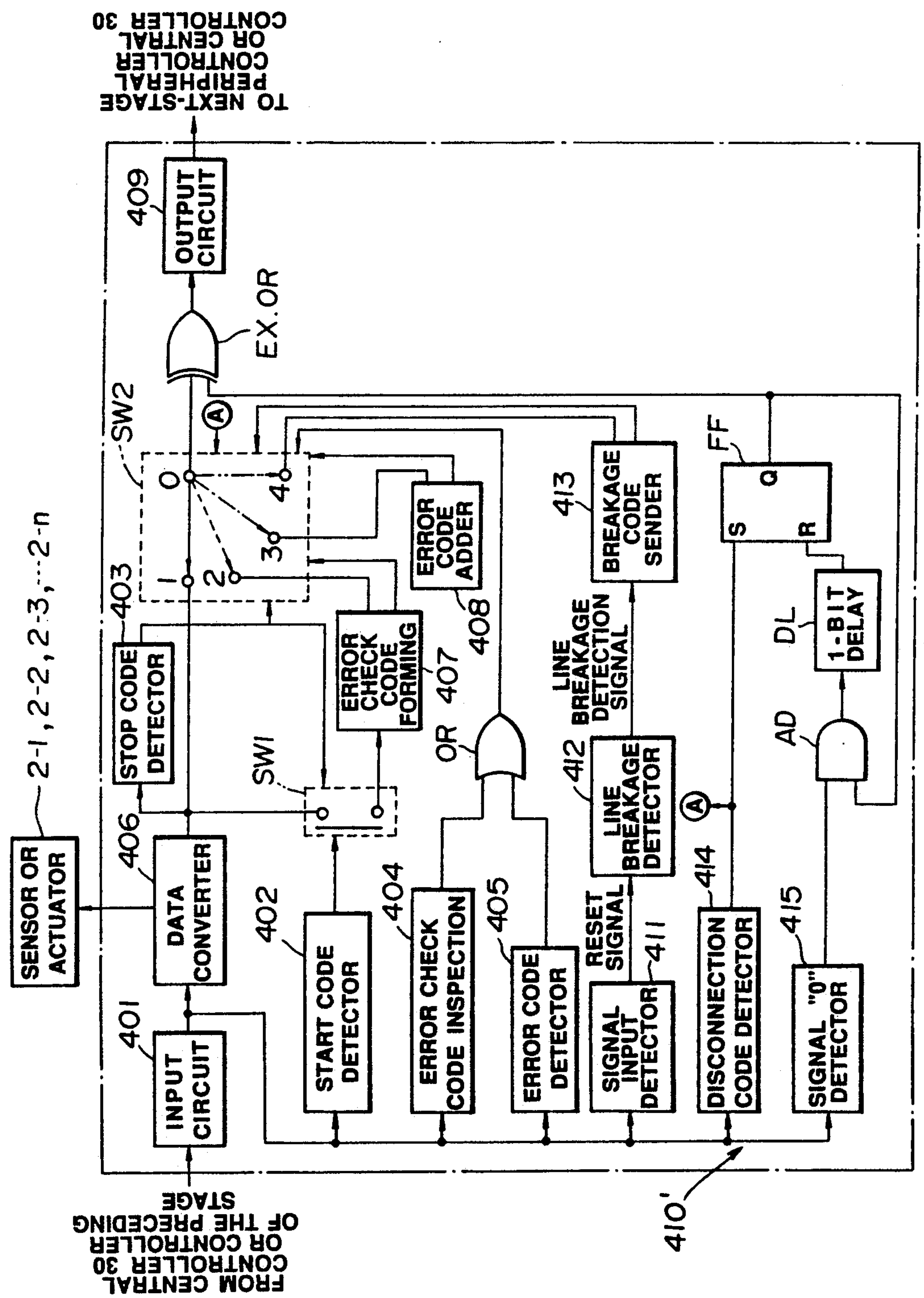
TO NEXT-STAGE PERIPHERAL CONTROLLER OR CENTRAL CONTROLLER 30
FROM CENTRAL CONTROLLER 30 OR CONTROLLER OF THE PRECEDING STAGE
SENSOR OR ACTUATOR
2-1, 2-2, 2-3, ... 2-n
INPUT CIRCUIT
401
DATA CONVERTER
406
STOP CODE DETECTOR
403
START CODE DETECTOR
402
ERROR CHECK CODE INSPECTION
404
ERROR CODE DETECTOR
405
SIGNAL INPUT DETECTOR
411
RESET SIGNAL
DISCONNECTION CODE DETECTOR
414
SIGNAL "0" DETECTOR
415
SW1
SW2
ERROR CHECK CODE FORMING
407
ERROR CODE ADDER
408
OR
LINE BREAKAGE DETECTOR
412
LINE BREAKAGE DETECTION SIGNAL
BREAKAGE CODE SENDER
413
AD
1-BIT DELAY
DL
FF
S
R
Q
EX.OR
OUTPUT CIRCUIT
409
410'
A
FIG.1

(SIGNAL S'2)

| LINE BREAKAGE CODE | 000 --------- 0 |
|---|---|

(A) (SIGNAL S'3)

| LINE BREAKAGE CODE | 100 --------- 0 |
|---|---|

(B) (SIGNAL S'4)

| LINE BREAKAGE CODE | 010 --------- 0 |
|---|---|

(C) (SIGNAL S'5)

| LINE BREAKAGE CODE | 110 --------- 0 |
|---|---|

(D) (SIGNAL S'n)

| LINE BREAKAGE CODE | 001110 --------- 0 |
|---|---|

(a) SIGNAL S0 | START CODE | TRAIN OF DATA 0 | STOP CODE | ERROR CHECK CODE 0

(b) SIGNAL S1 | START CODE | TRAIN OF DATA 1 | STOP CODE | ERROR CHECK CODE 1

(c) SIGNAL S2 | START CODE | TRAIN OF DATA 2 | STOP CODE | ERROR CHECK CODE 2

DEVICE FOR DETECTING THE POSITION OF BROKEN LINE IN A SERIES CONTROLLER

TECHNICAL FIELD

The present invention relates to a device for detecting the position of broken line suitable for a series controller for use in a centralized control system for a machine such as a press machine, a machine tool, construction equipment, a ship, or an aircraft, and in a centralized control system for an unattended conveyor or an unattended storagehouse.

BACKGROUND ART

When a press machine, a machine tool, construction equipement, a ship, an aircraft, an unattended conveyor an unattended storagehouse or the like is controlled in a centralized manner, many sensors for detecting the respective conditions of the elements of such machine and many actuators for controlling the respective conditions of the elements of the machine are required. The number of these sensors and actuators, for example, reaches 3,000 or more in the case of a press machine and much more in other devices.

Conventionally, a centralized control system which controls such a machine in a centralized manner is constructed such that many such sensors and actuators are connected to a main controller which collects the outputs of the sensors and controls the actuators in accordance with signals from the main controller.

In such conventional centralized control system, the number of lines which connect the main controller and the sensors and actuators is large and the structure of the input/output of the main controller is very complicated as the respective numbers of sensors and actuators are large.

An arrangement is proposed in which a plurality of nodes are connected in series, each node being connected to one or more sensors and actuators, the nodes being connected in a ring via a main controller which outputs signals to the respective nodes for controlling purposes. In such arrangement, basically, the main controller is required to have only signal input and output lines and the respective nodes are only required to connect signal input and output lines. Thus, the number of lines is greatly reduced.

However, in the arrangment where the nodes are connected in series, it is a problem how to ensure the simultaneous collection of the respective outputs of the sensors and the simultaneous respective control of the actuators. For example, if an arrangement is considered in which addresses are allocated to corresponding nodes, which are then controlled in accordance with those addresses, the problem is a time delay due to this address processing, and the simultaneous collection of the respective outputs of the sensors and of the simultaneous control of the actuators cannot be ensured.

The inventors have proposed a series control system which identifies the respective nodes according to the sequence of connection of the respective nodes to thereby render the address processing useless, eliminates the time delay due to the address processing, and greatly simplifies the node structure while discarding the concept of allocating addresses to the respective node although a structure to connect the respective nodes in series is employed.

This arrangement operates such that the respective nodes sequentially add the output signals from those nodes to the signals from the upstream nodes, sequentially extract signals from the upstream nodes to those nodes and outputs them to the actuators in those node in accordance with a predetermined rule. In this case, each node does not need any address, and no address processing is required, so that a time delay in each node includes a very small one required for timing only to thereby greatly simplify the structure of the nodes.

FIG. 11 shows one example of the structure of the whole series controller, mentioned above.

In FIG. 11, reference numeral 10 denotes a machine controller as the above controller which controls an object machine synthetically; 2-1 to 2-n, sensors or actuators disposed in the respective sections of the machine; 30, a central controller (main controller) disposed as the central processing unit at the machine controller 10; 4-1 to 4-n, peripheral controllers (node controllers) disposed as peripheral processing devices at the corresponding sensors or actuators 2-1 to 2-n to supply various data (sensor data or actuator control data) between the corresponding sensors or actuators and the central controller 30. In the illustrated series control system, the central controller 30 as the central processing unit and the peripheral controllers 4-1 to 4-n as the peripheral processing devices are connected in series in a ring via a signal line 50 as shown in FIG. 11.

FIG. 12 illustrates one example of protocols of signals S0-Sn which are transmitted between the controllers 30 and 4-1 to 4-n in the series controller.

In this example, the respective signals S0-Sn each include a "train of data" which comprises sensor data indicative of a respective one of the outputs of the sensors or control data indicative of the control contents to control the actuation of a respective one of the actuators; a "start code" disposed directly before the train of data and indicative of the head of train of data with a predetermined logical structure of a plurality of bits (for example, 8 bits); a "stop code" disposed directly after the train of data and indicative of the trailing end of the train of data with a predetermined logical structure (different from that of the start code); and an "error check code" generated in each of the controllers for detection of the occurance of an error among ports (the controllers) and added as a code signal of a predetermined number of bits (for example, of bits) directly after the stop code. The respective controllers 30 and 4-1 to 4-n recognize the presence of the data (the train of data) in accordance with the detection of the start code and stop code and the presence of error generation in accordance with a check on the "error check code" (using to CRC check or veritical/horizontal parity check or the like).

It is true that such series controller ensure achieving the transmission/reception of data and error check effectively by employing a signal having a protocol mentioned above as a signal to be transmitted between the respective controllers. However, when the signal line is broken, for example between the peripheral controller 4-1 and 4-2 of FIG. 11, the signal S1 and subsequent signals are not transmitted to the respective controllers, so that the data cannot be transmitted and received. Therefore, the position of the broken line is required at once to be found and the line is required to be repaired so as to recover the normal state.

In this case, if the central controller 30 supervises the signals during the operation time, it can determine surely whether line breakage has developed, but it cannot get information on where the line breakage developed such as "line breakage developed on a signal line corresponding to the signal S1 (before the peripheral controller 4-2)", so that repair or the like cannot rapidly be performed, disadvantageously.

The present invention derives from the contemplation of these situations. It is an object of the present invention to provide a device for detecting the position of broken line in a series controller which device is capable of getting correct information on the position of line breakage when it occurs to thereby allow the broken line to be repaired rapidly.

DISCLOSURE OF THE INVENTION

In the present invention, a plurality of peripheral processing devices each comprises: line breakage detection means for detecting a breakage on a signal line between that peripheral processing device and the preceding-stage peripheral processing device; line breakage signal generating means for outputting to the next stage peripheral processing device or the central processing unit a line breakage signal comprising a predetermined line breakage code indicative of the occurrence of line breakage and line breakage position data of a predetermined number of bits set initially when the line breakage detecting means detects the line breakage; line breakage code detecting means for detecting the line breakage code of the line breakage signal received from the preceding-stage peripheral processing device; and adder means for adding one to the line breakage position data of the line breakage signal received from the preceding-stage stage peripheral processing device when the line breakage code detecting means detects the line breakage code, whereby the line breakage position is detected on the basis of the added value of the line breakage position data of the line breakage signal input to the central processing unit.

When breakage develops on the signal line and no signal is transmitted to the peripheral processing device disposed directly after the breakage point, that processor outputs a line breakage signal.

If the subsequent peripheral processing devices receives the breakage signal from the preceding controllers, they increment line breakage position data of the detection signal by +'sequentially.

Thus, when the central processing unit receives the line breakage signal, it detects the breakage position by reverse calculation from the added value of the breakage position data included in the breakage signal received.

BRIEF DESCRIPTION OF THE DRAWINGS

FIG. 1 is a block diagram indicative of an illustrative specific structure of each of peripheral controllers constituting corresponding peripheral processing devices in one embodiment of a device for detecting the position of broken line in a series controller according to the present invention;

FIGS. 6(A)–(D) schematically illustrates the manner in which "l" is added in a binary manner to the breakage position detecting section for the breakage signal shown in FIG. 5;

BEST MODE FOR CARRYING OUT THE INVENTION

Embodiments of the present invention will now be described with reference to FIGS. 1–12.

Figures 11, 12:
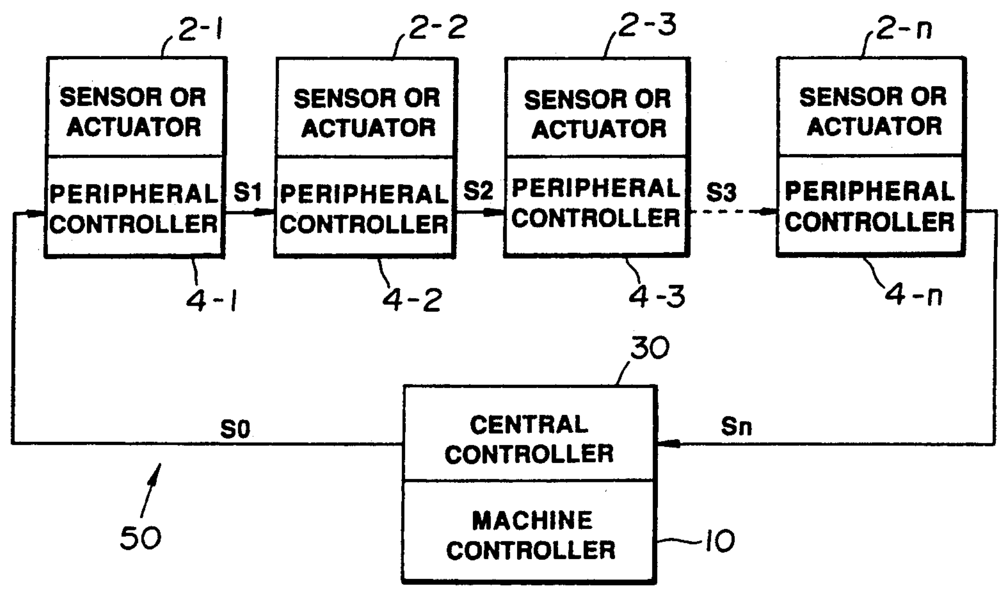
FIG. 11 is a block diagram indicative schematically of the structure of a series controller to which the present invention is applied.
FIG. 12, composed of FIGS. 12*a*–12*c*, schematically illustrates a transmission signal protocol employed usually in the series controller shown in FIG. 11.

FIG. 1 illustrates the specific structure of each of peripheral controllers 4-1 to 4-n as the peripheral processing devices. In this case, the use of a series controller having the structure shown in FIG. 11 is premised.

In this connection, it is assumed that all the peripheral controllers 4-1 to 4-n have the same structure in this embodiment.

As shown in FIG. 1, the peripheral controllers 4-1 to 4-n each include an input circuit 401 which receives a signal from a central controller 30 or the preceding peripheral controller and which demodulates this signal in a predetermined manner; a start code detector 402 which detects the "start code" indicative of the head of a train of data with a predetermined logical structure from the demodulated input signal; a stop code detector 403 which detects the "stop code" indicative of the trailing end of the train of data with a predetermined logical structure from the demodulated input signal; an error check code inspection circuit 404 which checks the presence of error generation between the preceding stage (port) and this stage (port) in accordance with the "error check code" of the demodulated input signal (generated and output by an error check code forming circuit 407, to be described later, of the preceding peripheral controller as a code to detect the presence of an error as mentioned above)"; and error code detector 405 which watches whether an "error code (generated and added by an error code adder circuit 408, to be described later, of the preceding peripheral controller in accordance with the detection of error generation)" indicative of the generation of an error is attached to the demodulated input signal and, if so, detects it; an OR circuit OR which ORes the error detection output from the error check code inspection circuit 404 and the error code detection output from the error code detector 405; a data converter 406 which converts data between the demodulated input signal (correctly, the train of data of the signal) and the corresponding sensor or actuator 2-1 to 2-n (in the case of the sensor, the data converter produces and outputs sensor data to be transferred from its stage in accordance with the input from the corresponding sensor while in the case of the actuator, the data converter produces and outputs a drive signal to drive the corresponding actuator in accordance with control data for the actuator; an error check code forming circuit 407 which generates and outputs an "error check code" newly in accordance with the demodulated input signal (inclusive of data added or eliminated via the data converter 406); a switching circuit SW1 which controls, on an on-off basis, the supply of the demodulated input signal to the error check code forming circuit 407; the error code adder circuit 408 which generates the "error code" and adds it to the input demodulator when required (in accordance with selection by a switching circuit SW2 to be described later); the switching circuit SW2 which selects and outputs at a time one of the demodulated input signal, the signal (error check code) generated and output from the error check code forming circuit 407, the signal (error code) output from the error code adder circuit 408 and a signal output from a line breakage code sending circuit 413 to be described later; an output circuit 409 which modulates in a required manner a signal selected and output by the switching circuit SW2 via an exclusive OR circuit EX.OR to be described later and sends the resulting signal to the next stage peripheral controller or the central controller 30; and a line breakage detecting section 410.

The breakage detecting section 410 includes circuits 411–415, an AND circuit AD, a flip-flop FF, a 1-bit delay circuit DL and an exclusive-OR circuit EX.OR The signal input detector 411 detects whether there is a signal input thereto. More specifically, it determines that there is a signal input when the start code or a line breakage code to be described later is received, and thus outputs a reset signal.

The line breakage detector 412 includes a timer and outputs a line breakage detection signal indicative of the presence of line breakage when the timer has counted a time T (for example, of five times the transmission period) long enough compared to the transmission period of the signal. It is assumed here that the timer is reset each time it receives a reset signal from the signal input detector 411.

A line breakage code sending circuit 413 sends a line breakage signal composed of a line breakage code and line breakage position data to be described later when it receives a line breakage detection signal from the line breakage detector 412. The circuit 413 has an output connected to a contact 4 of the switching circuit SW2.

A line breakage code detector 414 detects the line breakage code from the demodulated input signal and has an output connected to the set terminal S of the flip-flop FF.

A signal "0" detector 414, for example, includes an inverter which detects the signal "0", for example, by logical inversion of the demodulated input signal and has and output connected to one input terminal of the AND circuit AD.

The output terminal Q of the flip-flop FF is connected to another input terminal of the AND circuit AD.

The 1-bit delay circuit DL has an input and an output terminal connected to the output terminal of the AND circuit AD and the reset terminal R of the flip-flop FF.

The exclusive OR circuit EX.OR has input terminals connected to the flop-flop FF and the contact 0 of the switching circuit SW2, and an output connected to the output circuit 409.

The operation of the series controller performed when no line breakage develops on the signal line 50 of FIG. 11 will now be described.

Figure 2:
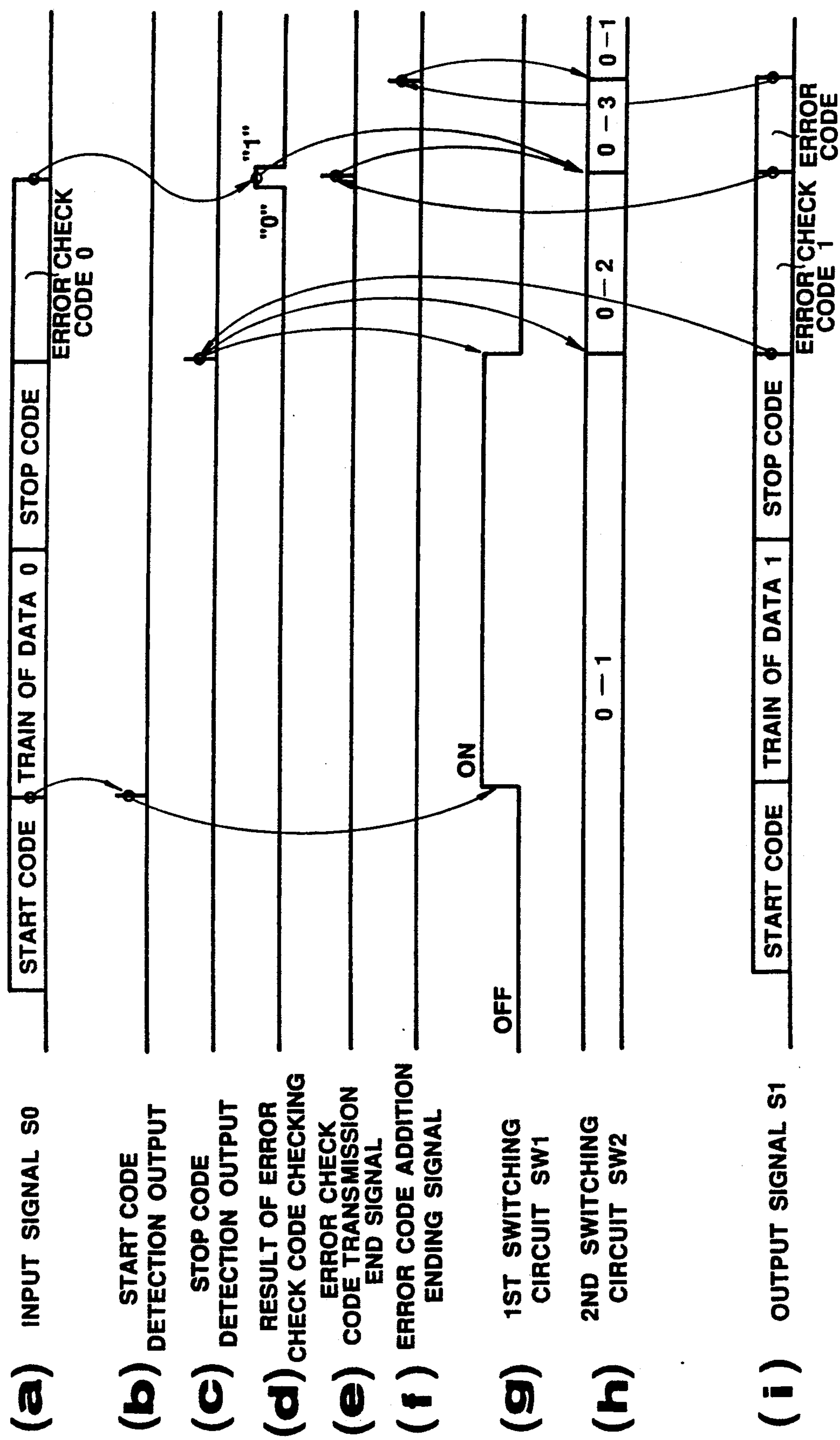
FIG. 2, composed of FIGS. 2*a*–2*i*, is a timing chart indicative of an illustrative operation of the peripheral controllers shown in FIG. 1 and illustrating the operation of the respective elements of the detecting device when no line breakage occurs.

FIG. 2 is a timing chart indicative of the signal processing operation executed by a respective peripheral controller, for example 4-1, when no line breakage develops. As an example, it is assumed here that an error has occurred in signal transmission between the central controller 30 and the peripheral controller 4-1.

Assume now that a signal is trasmitted from the preceding-stage central controller 30 to the next-stage controller 4-1 as shown in FIG. 2(*a*) and input and demodulated by the input circuit 401. The start code detector 402 detects the start code of the received signal with the timing shown in FIG. 2(*b*) and controls the switching circuit SW1 such that it is turned on (initially off) (see FIG. 2(*g*)). Thus, the error check code forming circuit 407 starts to generate an error check code to be transmitted to the next stage peripheral controller 4-2 in accordance with the input signal (mainly, a train of data). At this time, the switching circuit SW2 is maintained in an input selection state (shown by the solid line arrow in FIG. 1) which is the initial state as shown in FIG. 2(*h*), the start code and the train of data as they are applied via the switching circuit SW2 to the output circuit 409 and transferred as the signal S1 to the next peripheral controller 4-2 via the output circuit 409 (see FIGS. 2(*h*) and (*i*)). In the meantime, the data converter 406 converts (generates) data to be transmitted to or received from the corresponding sensor (or actuator 2-1).

A stop code of the signal thus transmitted is detected with the timing shown in FIG. 2(*c*).

When the stop code detector 403 detects the stop code, it switches the switching circuit SW1 to its initial off state and the switching circuit SW2 to its terminal 2 input selection state (selection state shown by the broken line arrow or FIG. 1) (see FIGS. 2(*c*), (*g*) and (*h*)).

In response to such switching of the switching circuit SW2, it selects and outputs and error check code 1, newly generated by the error check code forming circuit 407, subsequent to the detected stop code and transfers it via the output circuit 409 (see FIG. 2(*i*)).

Simultaneously, the error check code inspection circuit 404 checks and error check code 0 transferred from the preceding stage central controller 30. As a result, if no data error is generated, the error check code detector 407 produces no signal. Otherwise, if the generation of the error is confirmed with the error check code 0, as assumed here, the error check code inspection circuit 404 outputs an error detection signal having a logical "1" level of a short duration simultaneously with the confirmation of the error generation (see FIG. 2(*d*)). Therefore, during this time (when the error detection signal is being output), the output from the OR circuit OR has a logical "1" level. The output from this OR circuit OR is applied to the switching circuit SW2 together with an error check code transmission ending signal (see FIGS. 2(*i*) and (*e*)) generated in response to the ending of the output of the error check code generated by the error check code forming circuit 407.

On the condition of reception of the transmission ending signal from the error check code forming circuit 407, the switching circuit SW2 is switched in accordance with the logical level of the signal applied by the OR circuit OR; namely, to its initial terminal 1 input selection state if the logical level of the signal from the OR circuit OR is at the logical "0" level, and to its terminal 3 input selection state (shown by a dot-dashed line arrow in FIG. 1) if the signal from the OR circuit OR is at the logical "1" level as illustrated in the particular embodiment. Therefore, in this case, simultaneously with the generation of the error check code transmission ending signal, the switching circuit SW2 is put into the terminal 3 input selection state, so that the error check code (error check code 1) generated and output by the error check code forming circuit 407 and then an error code output from the error code adder circuit 408 are added to the signal transferred via the transmission circuit 409 (FIGS. 2(*h*) and (*i*)).

Therefore, when the error code adder circuit 408 has completed the addition of the error code, it outputs an error code addition end signal to the switching circuit SW2 (see FIGS. 2(*a*) and (*f*)) to thereby put the switching circuit SW to its initial terminal 1 selection state (see FIG. 2(*h*)).

An error code reporting the error generation state is added satisfactorily to the signal S1 transferred from the peripheral controller 4-1 to the next stage peripheral controller 4-2 by the above operation of the controller 4-1.

During that interval, since no line breakage code is detected from the demodulated input signal output by the input circuit 401 of the peripheral controller 4-1, the flip-flip FF is not set. Therefore, the output of the flip-flop FF is maintained at the logical "0" level and the exclusive OR circuit EX.OR outputs the very signal S1 (see FIG. 2(*i*)) applied to the circuit EX.OR via the switching circuit SW2.

The operation of the peripheral controller 4-2 and subsequent elements will now be described.

If there is no breakage on a signal line 50 between the peripheral controllers 4-1 and 4-2 shown in FIG. 11, the peripheral controller 4-2 detects the start code of the demodulated input signal for the input signal S1 via the input circuit 401, sends/receives the corresponding data, detects the stop code, checks the error check code 1 (error check), generates and adds a new error check code 2 and adds an error code (no error code if there are no errors generated).

If there is line breakage between the controllers 4-1 and 4-2, the signal S1 is not input to the peripheral controller 4-2, so that the above operation is not performed and the controller 4-2 performs the following operations.

If the line breakage occurs, the signal input detector 411 of the peripheral controller 4-2 does not detect the signal S1 (start code) continuously throughout more than a time T due to the line breakage although the peripheral controller 4-1 outputs the signal S1 at a transmission period less than the time T. Therefore, the detector 411 outputs no reset signal even if the time T has elapsed. As a result, the line breakage detector 412 timer is not reset even if the time T has passed, and thus outputs a line breakage detection signal.

When the line breakage code sending circuit 413 receives the line breakage detection signal, it adds the signal to the switching circuit SW2. As a result, the switching circuit SW2 is switched to a terminal 4 input selection state (shown by dot-dot-dashed line in FIG. 1).

Figures 5, 6, 7:
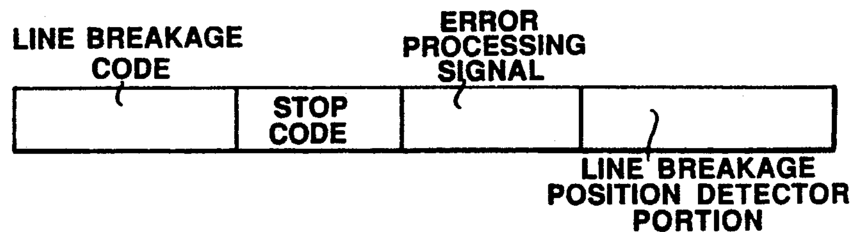
FIGS. 5 and 7 schematically illustrate a protocol of a line breakage signal.

Simultaneously, the line breakage code sending circuit 413 outputs a line breakage signal ($S'_2$), as shown in FIG. 5, which comprises a line breakage code indicative of the occurrence of line breakage with a logical structure different from those of the start codes used in the trains of signals shown in FIG. 12, and the line breakage position data accompanying the line breakage code and having the number of bits equal to, or larger than, ($\log_2 n$) (n is the number of peripheral controllers 21-2n), namely, the number of bits in which the overall number of peripheral controllers can be added in a binary manner, each bit value being at logical "0" level.

Therefore, the line breakage signal ($S'_2$) is output via the switching circuit SW2 and output circuit 409 from the peripheral controller 4-2. The signal $S'_2$ is sent at periods TB (<<T).

Also in the peripheral controller 4-3, the line breakage detector 412 outputs a line breakage detection signal due to the line breakage of the signal line 50 before the preceding stage peripheral controller 4-2 and the line breakage code sending circuit 413 starts to output a line breakage signal in response to the line breakage detection signal. When the line breakage code of the line breakage signal $S'_2$ output by the preceding stage peripheral controller 4-2 is detected by the line breakage code detector 414, the switching circuit SW2 is switched to the terminal 1 selection state. Thereafter, since the line breakage signal $S'_2$ is received succesively from the preceding controller 4-1 at periods TB (<<T), as described above, the line breakage code sending circuit 413 of the peripheral controller 4-3 does not send a line breakage signal, and the line breakage position data of the line breakage signal $S'_2$ input from the preceding stage controller 4-2 is added in a binary manner as follows.

Figure 3:
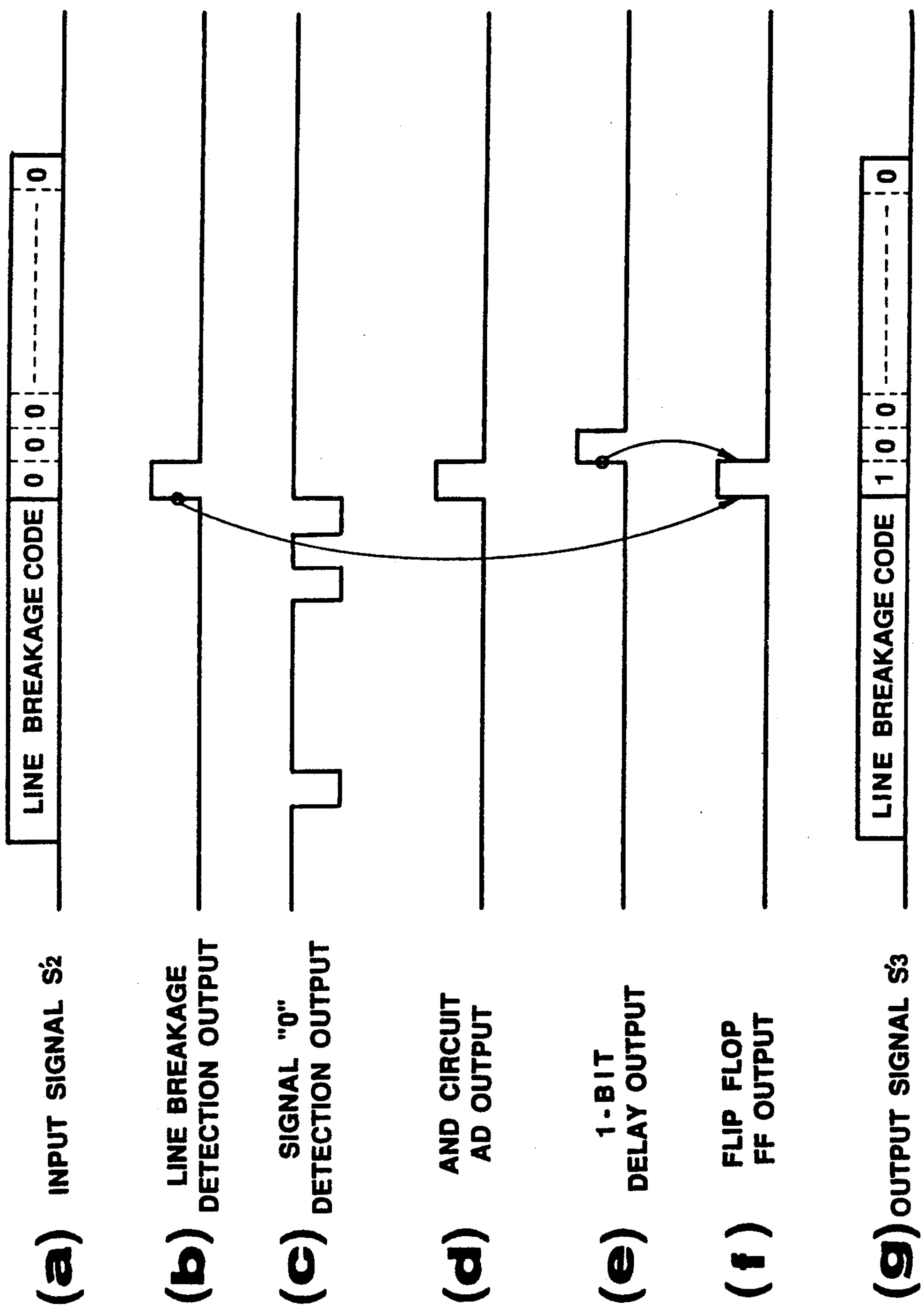
FIGS. 3, composed of FIGS. 3*a*–3*g*, and 4, composed of FIGS. 4*a*–4*g*, are a timing chart indicative of the illustrative operation of the peripheral controllers shown in FIG. 1 and illustrating the respective operation of the elements of the detection device when a line breakage occurred.

FIG. 3 is a timing chart indicative of the operation of the peripheral controller 4-3, and will also be used to describe the controller.

When the peripheral controller 4-3 receives the line breakage signal $S'_2$ (see FIG. 3(*a*)), the line breakage code detector 414 of the controller 4-3 outputs a signal which becomes logically "1" for the duration time of one bit simultaneously with the detection of the line breakage code as shown in FIG. 3(*b*). The flip-flop FF is set in response to the detection of the line breakage code (a rise edge of the code) (see FIG. 3(*b*) and (*f*)).

The signal "0" detector 415 detects the logical "0" level of the input signal $S'_2$, as shown in FIG. 3(*c*).

When the output signal (FIG. 3(*c*)) of the signal "0" detector 415 and the output signal (FIG. 3(*f*) of the flip-flop FF are applied to the AND circuit AD, the AND circuit AD outputs the signal "1" from the time when it detects the starting point of the initial logical "0" level bit of the line breakage position data in the input signal $S'_2$. In the 1-bit delay circuit DL, the output from the AND circuit AD is output delayed by a one-bit time. The output from the delay circuit DL is applied to the reset terminal of the flip-flop FF, which is reset at the timing of a rise edge of the output signal from the delay circuit DL (at the end of the initial logical "0" level bit), so that the flip-flop FF outputs the signal "1" continuing from the start of the line breakage position data to the time when it terminates the detection of the initial logical "0" level bit (see FIGS. 3(*e*) and (*f*)). The output of the flip-flop FF thus obtained (FIG. 3(*f*)) is applied to one input terminal of the exclusive OR circuit EX.OR.

The exclusive OR circuit EX.OR receives at its other input terminal the input signal $S'_2$, which comprises the version of the input signal demodulated by the input circuit 401, via the data converter 406 and switching circuit SW2. Since the input signal $S'_2$ includes no train of data, the data converter 406 does not transmit/-receive data to and from the corresponding sensor or actuator (2-3) and the signal $S'_2$ as it is passes through the data converter 406.

Since the input signal $S'_2$ does not include a stop code, an error check code and an error code, the stop code, error check code and error code are not detected by the stop code detector 403, error check code are not detector 404 and error code detector 405, respectively. Thus the switching circuit SW2 is maintained in its initial state or in the terminal 1 input selection state without being switched.

As a result, the very input signal $S'_2$ having passed through the data coverter 406 passes through the switching circuit SW2 and is applied to the other input terminal of the exclusive OR circuit EX.OR.

Thus when the exclusive OR circuit EX.OR receives the input signal $S'_2$ shown in FIG. 3(*a*), it outputs an output signal $S'_3$ which comprises the exclusive OR of the input signal $S'_2$ and the output signal of the flip-flop FF of FIG. 3(*f*), namely, having a structure which comprises the unchanged logical structure of line breakage code of the input signal $S'_2$, and the logical structure of the line breakage position data which comprises the binary addition of "1" to the logical structure "000 . . . 0" of the line breakage position data of the input signal $S'_2$. The signal $S'_3$ is output via the output circuit 409 to the subsequent peripheral controller 4-4 (see FIG. 3(*g*)).

Each time the line breakage signals ($S'_3$, . . . ) have passed through the corresponding subsequent peripheral controller 4-4, . . . , subsequent binary addition of the numerical values of the line breakage position data of the signals is performed in the same manner as that mentioned above (see FIGS. 6(A)–(D)).

Figure 4:
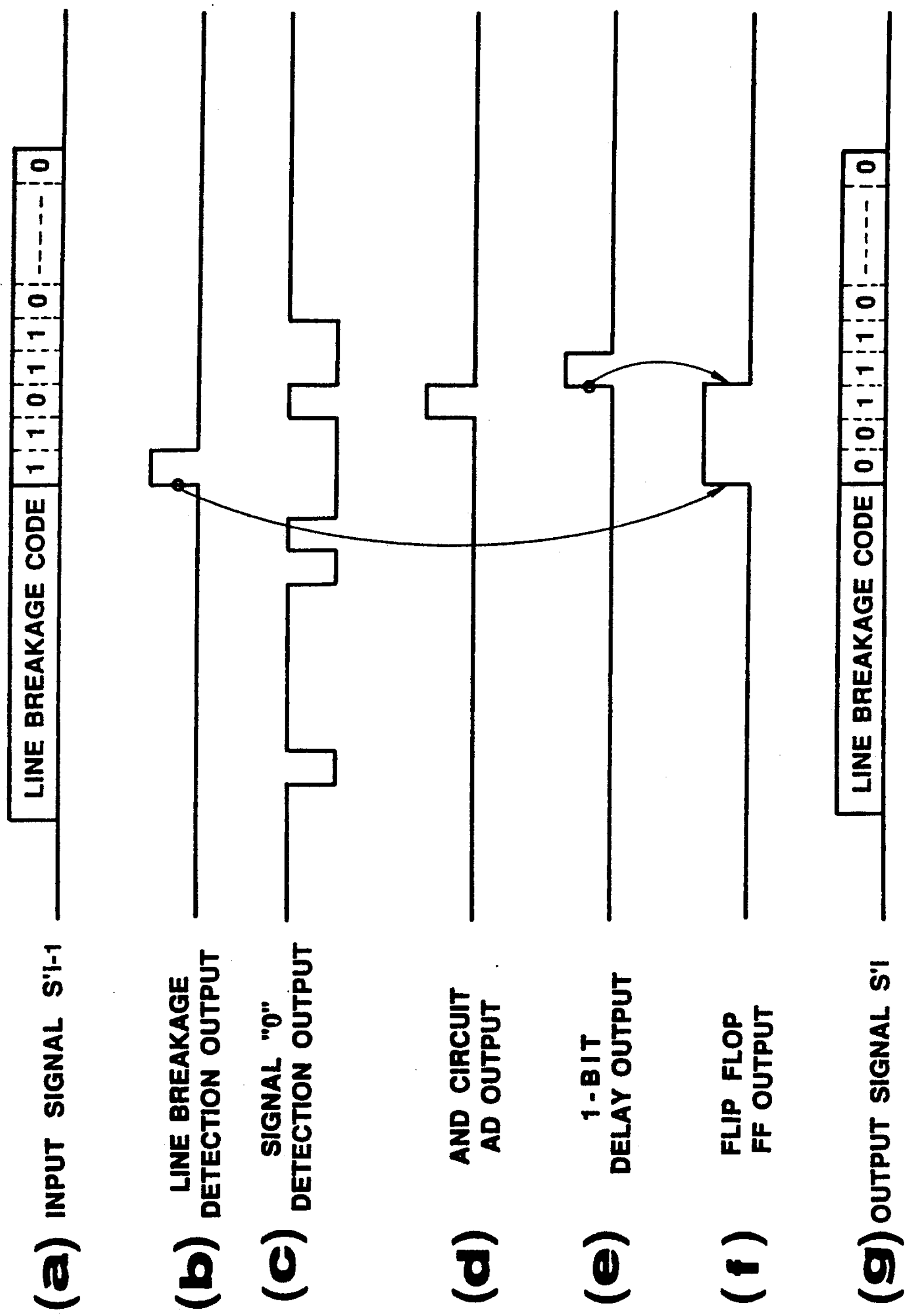

As shown in FIG. 4, if, for example, a signal $S'_{i-1}$ in which the line breakage position data has the logical structure "110110 . . . 0" is input to the peripheral controller 4-i as shown in FIG. 4(*a*), the line breakage detector 414 detects a line breakage code at the timing shown in FIG. 4(*b*) and the flip-flop FF is set at this timing (see FIGS. 4(*b*) and (*f*)).

The signal "0" detector 415 detects the logical "0" level of the input signal $S'_{i-1}$ as shown in FIG. 4(*c*), and the output signal from the detector 415 and the output signal from the flip-flop FF (see FIG. 4(*f*)) are applied to the AND circuit AD.

Therefore, the AND circuit AD outputs "1" from the time when it detects the first logical "0" level bit of the breakage position detection portion of the input signals $S'_{i-1}$ (see FIG. 4(*d*)). The 1-bit delay circuit DL provides the output of the AND circuit AD delayed by a one-bit time.

Since the flip-flop FF is reset at the timing of a rise edge of the signal from the delay circuit DL (at the bit end of the first logical "0" level), it outputs a signal whose respective bit values are at the logical "1" level from the first bit of the line breakage position data to the bit end of the first logical "0" level of the line breakage position data (see FIGS. 4(*e*), (*f*)).

The exclusive OR circuit EX.OR outputs the exclusive OR of the input signal $S'_{i-1}$ of FIG. 4(*a*) and the output signal of the flip-flop FF, namely, the output line breakage signal $S'_i$ (binary added values "001110 . . . 0") in which the line breakage code has a logical structure as it is while the line breakage position data includes logically inverted bits from its first bit to the bit end of the first logical "0" level with subsequent unchanged bit values). Namely, the signal $S'_i$ has a binary added logical structure. The signal $S'_i$ is output via the output circuit 409 to the next stage peripheral controller $S_{i+1}$.

Figure 8:
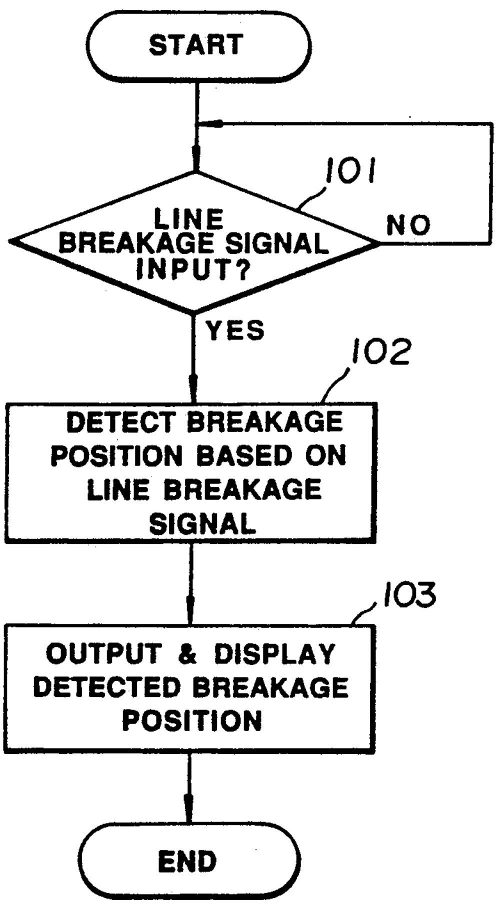
FIG. 8 is a flowchart illustrating the processing performed by the central controller 30.

When the central controller 30 receives the line breakage signal as an output signal $S'_n$, it performs the processing shown in FIG. 8.

Namely, it is determined whether the line breakage signal is input to the controller 30 (step 101). If the result of the determination at step 101 is YES, the binary added value of the line breakage position data of the input line breakage signal is converted to a decimal number indicative value and a process for specifying the position where the line breakage occurred is executed. If a signal $S'_n$ is received in which the line breakage position data has the logical structure "11000110 . . . 0", for example, as the line breakage signal, the binary number "1100011" is converted to $$1(=1\times 2^0)+2(=1\times 2^1)+32$$

$$(=1\times 5^5)+64(=1\times 2^6)=99$$

which is a decimal number (99). Therefore, the occurrence of line breakage directly before the 100 $(99+1)^{th}$ peripheral controller before the central controller 30 is detected. It is assumed that the number of peripheral controllers is 100 (n=100). The occurrence of line breakage between the peripheral controller 4-1 and the central controller 30 is then detected. Furthermore, in an arrangement including 100 peripheral controllers and if the bit length of the line breakage code is at least $$[\log_2 100]=[6.6]=7 \text{ (bits)}$$

the central controller 30 is capable of recognizing the occurrence of line breakage securely even if the signal line 50 is broken at any point along the line 50 (step 102).

The result of the detection at step 102 is output to an external display (for example, of a CRT) which displays line breakage position data, for example, in the form "THERE IS LINE BREAKAGE BETWEEN PERIPHERAL CONTROLLER 4-1 AND CENTRAL CONTROLLER 30", for example (step 103). If the line breakage position data is displayed in this way, the operator can repair and recover from the broken signal line rapidly in accordance with the display.

As described above, according to the particular embodiment, a line breakage code indicative of the presence of line breakage when no signal is received continuously over more than the present time T, and a line breakage signal having line breakage position data of a predetermined number of bits are output. This signal increments the logical structure of the line breakage position data "1" by "1" in a binary manner each time the signal has passed through the subsequent-stage peripheral controller. When the signal finally arrives at the central controller, it is securely detected where the line breakage occurred in accordance with the binary added value of the line breakage position data and this fact is displayed, so that repair and recovery of the signal line can be performed rapidly.

While in the particular embodiment the line breakage signal comprising the line breakage code and the line breakage position data is illustrated as being used as shown in FIG. 5, it may include an error processing signal which comprises a stop code, an error check code and an error code as in a regular data signal, as shown in FIG. 7, for example.

The structure of the line breakage detecting section 410 shown in the above embodiment as well as the structure of the respective peripheral controllers each including the detecting section 410 are illustrated as an example only. Basically, as long as the peripheral controllers 4-1 to 4-n include a structure which outputs a signal of a protocol such as, or conforming to, that shown in FIG. 5, namely, a breakage signal comprising at least a line breakage code indicative of the presence of line breakage and line breakage position data having a logical structure of the binary added type, detects the line breakage code when that breakage signal is received to add "1" to the line breakage position detecting section in a binary manner and outputs the result, they may take any other form, of course.

Figure 9:
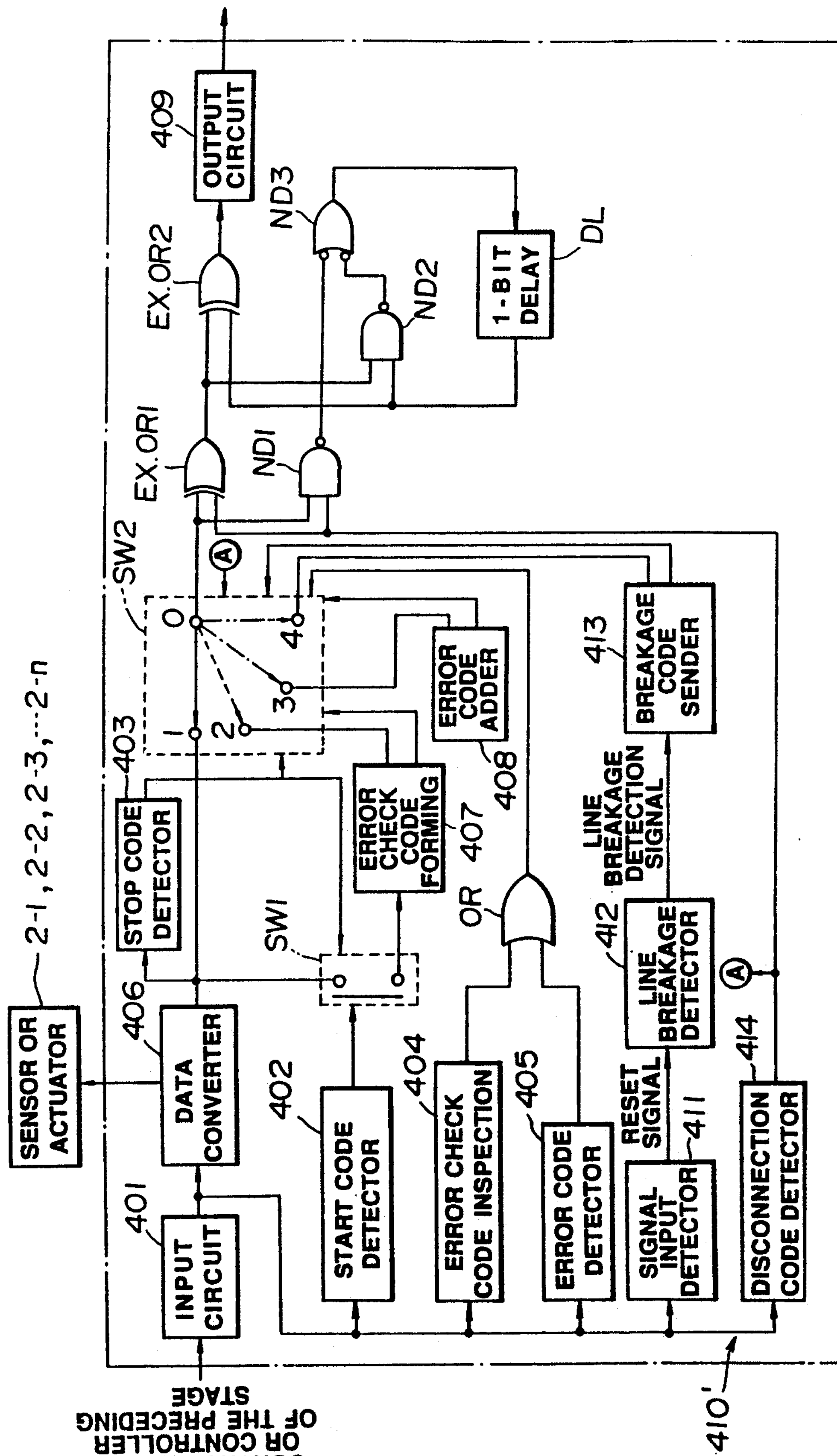
FIG. 9 is a block diagram indicative of a specific structure of each peripheral controller in another embodiment.

For example, FIG. 9 illustrates a peripheral controller which includes a line breakage detecting section 410 which in turn comprises a signal input detector 411, a line breakage detector 412, a line breakage code sending circuit 413, a line breakage code detector 414 and a full adder, namely, an exclusive OR circuits EX.OR 1, and EX.OR 2, NAND circuits ND1–ND3, and a 1-bit delay circuit DL.

In FIG. 9, the same reference numeral used denotes the same function as that in the previous embodiment.

Figure 10:
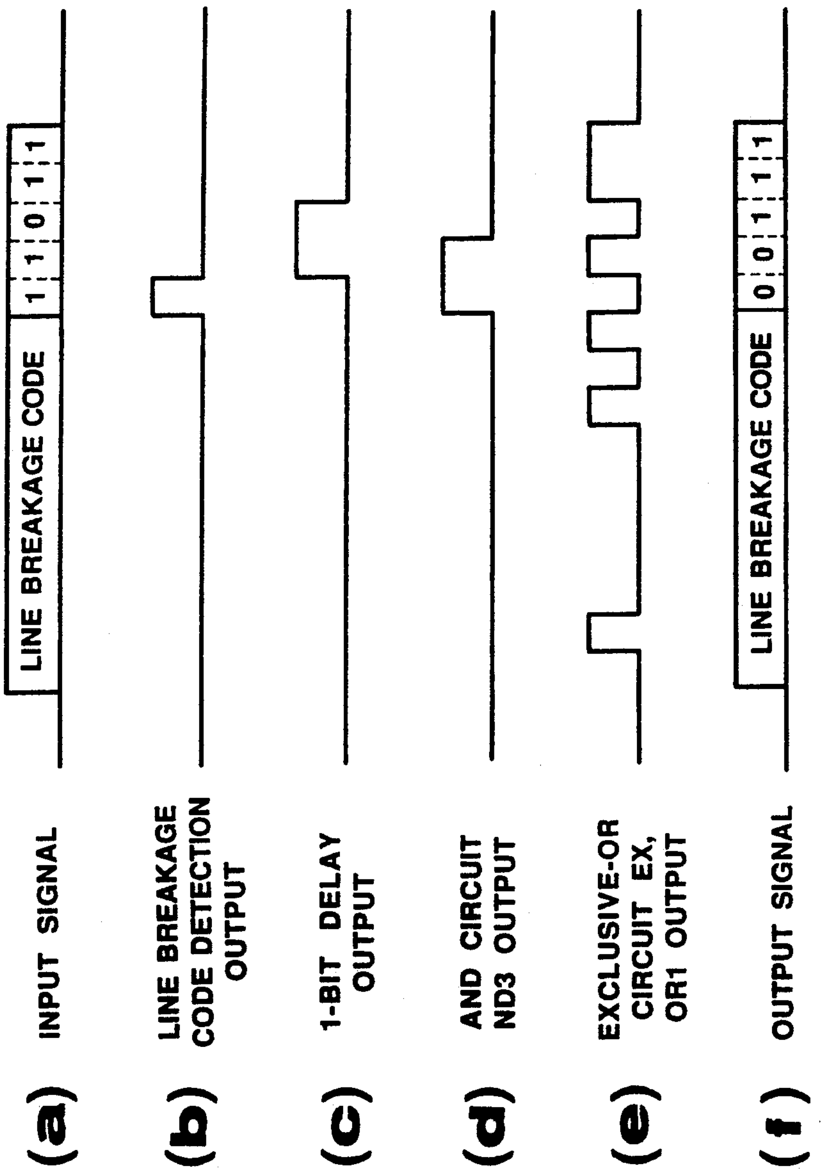
FIG. 10, composed of FIGS. 10*a*–10*f*, is a timing chart indicative of the respective operations of the elements of the detecting device when a line breakage signal is input to the peripheral controller shown in FIG. 9.

Assume now that the peripheral controller receives a line breakage signal where the logical structure of line breakage position data (of 5 bits) is "11011" as shown in FIG. 10(*a*). The line breakage code detector 414 detects the line breakage code and simultaneously outputs a signal having the logical "1" level for a one-bit duration time (see FIG. 10(*b*)). Thus, the 1-bit delay circuit DL, NAND circuit ND3 and exclusive OR circuit EX.OR1 of the subsequent stage produce the corresponding outputs shown in FIGS. 10(*c*)–(*e*). The exclusive OR circuit EX.OR2 outputs a signal, having the logical structure "00111" in the form of the binary sum of "1" and the logical structure "11011" of the line breakage position data of the input signal, to the subsequent stage controller via the output circuit 409.

While in the particular embodiment the application of the present invention to the arrangement in which the central controller and the peripheral controllers are connected in a ring has been illustrated, the present invention may be applicable to an arrangement where the central controller is disposed at either the leading end or the trailing end of an array of peripheral controllers in accordance with the type of the sensors or actuators of the peripheral controllers, of course. If the central controller is disposed at the leading end of the array, the peripheral controller at the trailing end of the array may additionally have processing functions similar to those of FIG. 8 to detect line breakage points.

INDUSTRIAL APPLICABILITY

As described above, according to the present invention, if there is line breakage on the signal line of the series controller, it is detected securely. Therefore, repair of and recovery from the broken line can be performed rapidly, and useless time due to interruption of the operation is reduced to greatly improve the operation efficiency.

By employing the device for detecting the position of broken line according to the present invention, a highly reliable series controller is realized.

I claim:

1. A device for detecting the position of broken line in a series controller comprising a plurality of sensors or actuators disposed at respective elements of a machine and a central processing unit which controls the plurality of peripheral processing devices and the central processing unit which controls the peripheral processing devices are connected in series via a signal line whereby control data applied from the central processing unit to the actuators and sensor detection data input from the sensors to the central processing unit are transmitted in one direction serially via the plurality of peripheral processing devices, the plurality of peripheral processing devices each comprising:

line breakage detection means for detecting breakage on the signal line between that peripheral processing device and the preceding-stage peripheral processing device;

line breakage signal generating means for outputting to the next stage peripheral processing device or the central processing unit a line breakage signal comprising a predetermined line breakage code indicative of the occurrence of line breakage and line breakage position data of a predetermined number of bits set initially when the line breakage detecting means detects the line breakage;

line breakage code detecting means for detecting the line breakage code of the line breakage signal received from the preceding-stage peripheral processing device; and adder means for adding one to the line breakage position data of the line breakage signal recieved from the preceding-stage peripheral processing device when the line breakage code detecting means detects the line breakage code, whereby the line breakage position is detected on the basis of the added value of the line breakage position data of the line breakage signal input to the central processing unit.

2. A device according to claim 1, wherein the line breakage detecting means includes a timer and detects the presence of line breakage when the timer counts a preset time longer than the transmission periods of the control data and detection data.

3. A device according to claim 2, wherein the timer of the line breakage detecting means is reset when the line breakage signal is received, and wherein the line breakage signal generating means outputs the line breakage signal at transmission periods shorter than those of the control data and the detection data, and wherein the line breakage signal generating means of the peripheral processing devices other than that directly after the signal line where the line breakage occurred is prevented from outputting a line breakage signal.

4. A device according to claim 1, wherein the predetermined number of bits of the line breakage position data is larger than ($\log_2 n$) where n is the number of peripheral processing devices used.

5. A device according to claim 1, wherein the respective bits of the initial preset values of the line breakage position data are all at logical "0" level.

6. A device according to claim 5, wherein the detection of the line breakage position based on the added value of the line breakage position data includes the detection of line breakage on a signal line directly before the $(N+1)^{th}$ peripheral processing device before the central processing unit where N is a decimal number version of a binary number indicative of the line breakage position data.

* * * * *